United States Patent
Goehlich et al.

(10) Patent No.: US 6,872,890 B2
(45) Date of Patent: Mar. 29, 2005

(54) THREE-PHASE HIGH VOLTAGE CABLE ARRANGEMENT HAVING CROSS-BONDED CABLE SCREENS AND CROSS-BONDED WATER SENSING WIRES

(75) Inventors: Lothar Goehlich, Berlin (DE); Winfried Fricke, Baiersdorf (DE)

(73) Assignee: PIRELLI Kabel und Systeme GmbH & Co. KG, Berlin (DE)

( * ) Notice: Subject to any disclaimer, the term of this patent is extended or adjusted under 35 U.S.C. 154(b) by 0 days.

(21) Appl. No.: 10/240,161
(22) PCT Filed: Mar. 29, 2001
(86) PCT No.: PCT/EP01/03625
§ 371 (c)(1),
(2), (4) Date: Dec. 17, 2002
(87) PCT Pub. No.: WO01/73796
PCT Pub. Date: Oct. 4, 2001

(65) Prior Publication Data
US 2004/0011551 A1 Jan. 22, 2004

(30) Foreign Application Priority Data
Mar. 31, 2000 (EP) ............................................. 00107008

(51) Int. Cl.[7] .............................................. H02G 15/02
(52) U.S. Cl. ..................... 174/74 R; 174/78
(58) Field of Search .............................. 174/74 R, 75 C, 174/78, 84 R, 88 R, 15.1, 15.4, 15.5, 15.6, 19, 21 R, 32, 35 R, 125.1

(56) References Cited

U.S. PATENT DOCUMENTS
2003/0098175 A1 * 5/2003 Goehlich

FOREIGN PATENT DOCUMENTS
| | | | | |
|---|---|---|---|---|
| DE | 2940193 A1 | * | 10/1979 | ............ H01B/7/28 |
| DE | 29 40 193 A1 | | 4/1981 | |
| DE | 4102114 C2 | * | 1/1991 | ......... H02G/15/105 |
| EP | 1490609 A | * | 7/1969 | |
| EP | 0 071 435 A1 | | 2/1983 | |
| WO | WO 02/054415 A1 | * | 7/2002 | ............ H01B/7/28 |

OTHER PUBLICATIONS
Peschke et al.; "Cable Systems for High and Extra–High Voltage"; Pubicis–MCD–Verlag, pp. 58–62, (1999).
Goehlich et al.;"Wassermonitoring–System Für VPE–Hochspannungskabel"; zur Detektion und Ortung von Mantelfehiem, Elektrizitätswirtschaft, Jahrgang 97, Heft 1–2, (1998).

* cited by examiner

Primary Examiner—William H. Mayo, III
(74) Attorney, Agent, or Firm—Finnegan, Henderson, Farabow, Garrett & Dunner, L.L.P.

(57) ABSTRACT

A cable arrangement where three cables have at least two cross-bonding locations when transmitting power between a first location and a second location. At the cross-bonding location not only the screens but also the water sensing wires are cross-bonded in cross-bonding devices. Thus, voltage differences between the water sensing wires and the screens of the respective cables in the three-phase system can be avoided. A particular application is found in high power transmission systems using high voltage cables.

6 Claims, 11 Drawing Sheets

THREE-PHASE HIGH VOLTAGE CABLE ARRANGEMENT HAVING CROSS-BONDED CABLE SCREENS AND CROSS-BONDED WATER SENSING WIRES

CROSS REFERENCE TO RELATED APPLICATIONS

This application is a national phase application based on PCT/EP01/03625, filed Mar. 29, 2001, the content of which is incorporated herein by reference, and claims the priority of European Patent Application No. 1007008.5, filed Mar. 31, 2000, the content of which is incorporated herein by reference.

FIELD OF THE INVENTION

The invention relates to a three-phase high voltage cable arrangement for transmitting power from a first location to a second location over a predetermined distance of e.g. a few km. In particular, the invention relates to such a three-phase high voltage cable arrangement where the screens of the cables are cross-bonded at a particular screen cross-bonding location at least twice over said distance.

The cables of the cable arrangement in accordance with the invention also comprise at least one water sensing wire for sensing water intrusion into the respective cable. For such a three-phase high voltage cable arrangement the invention in particular addresses the problem how difference voltages between the water sensors and the cable screens can be avoided without using a high voltage protection device.

BACKGROUND OF THE INVENTION

FIG. 1 shows a typical three-phase high voltage cable arrangement CA for transmitting power from a first location A to a second location B including a first, second and third high voltage cable L1, L2, L3 for transmitting the respective currents of each phase R, S, T. A typical distance is 1–2 km.

The individual cables L1, L2, L3 have a typical construction of a high voltage cable as shown in FIG. 2. A conductor 1 is surrounded by an insulation 3 and the insulation is surrounded by a screen 5 and an outer coating 6. The screen can have a cross section of 35–50 mm² and has a very high conductivity of ≈0,017 Ωmm². Preferably, the screen is made of copper.

Furthermore, the conductor 1 may be surrounded by an inner conducting layer 2 and the insulation 3 may be surrounded by an outer conducting layer 4. These layers have low conductivity and are sometimes also called "semi-conducting" layers. Such a cable construction is typically used for high voltages of >10 kV.

In a cable arrangement including three different cables L1, L2, L3 each having a construction as shown in FIG. 2 losses occur. The total losses can be divided into two types, namely losses that only occur if current is flowing in the cable system (current-related losses) and losses which are produced solely by the effect of the electrical field in the insulation (voltage-dependent losses). The current-dependent losses do not only occur in the current-carrying conductor itself (conductor losses) but also as so-called additional losses in the other metallic elements of the cable system where eddy and circulating currents are induced under the effect of the magnetic field of the current-carrying conductor. The conductor losses are for example Joule losses and also due to skin and proximity effects.

The most important additional losses are those caused by the axial induction currents in the metallic screen. Such additional losses in the cable sheath, screen and other metallic system components can be reduced by use of non-magnetic steel for armouring to prevent magnetic reversal losses, by grounding of the screens or metal sheaths at one end to avoid providing a closed loop for the induction currents, or by a so-called "cross-bonding" of the cable sheaths or screens to largely compensate the induction voltages such that the screen/sheath current and consequent losses are minimized in spite of the entire arrangement being grounded at both ends.

In the cross-bonding technique the cable arrangement is subdivided into three cable sections FCS, SCS, TCS and at two cross-bonding locations SCB1, SCB2 the screens 5 are cyclically connected such that the totally induced sheaths or screen voltage adds up to zero over the entire lengths, as shown in the bottom graph in FIG. 1.

Such techniques are described by Egon F. Peschke and Rainer von Ohlshausen in "Cable Systems for High and Extra-High Voltage", Publicis-MCD-Verlag 1999, ISBN 3-89578-118-5, pages 58–62.

PRIOR ART OF THE INVENTION

The screen 5 surrounding the insulation 3 of the cable shown in FIG. 2 typically consists of a wire braiding, possibly covered with an aluminium layer and extruded with another coating. The aluminium layer can additionally prevent the intrusion of water into the respective layers of the cable. Also the use of a lead coating and aluminium sheath is known.

High voltage cables having an insulation 3 of cross-polyethylene are particularly prone to humidity problems. Such cables must have a permanently waterproof outer coating, since the presence of water in the screen region can cause aging of the insulation by "water treeing". In principle, water can only intrude into the screen or other parts of the cable if the outer coating 6 is destroyed or damaged during the lifetime of the cable. Such damages can however not be excluded over an operation lifetime of 30–50 years, e.g. if the cable is damaged accidentally when digging the ground.

To detect the intrusion of water into the screen immediately and to limit the damage to the system by an immediate repair high voltage cables can be equipped with electric water sensors. These water sensors are typically in the form of water sensing wires 7 as indicated in FIG. 2 and FIG. 3. These water sensing wires 6 can be arranged anywhere in the layered structure of the cable. Preferably, in composite-layer coating cables the water sensing wires 7 are arranged between the wires of the screen 5 as in particular shown in FIG. 3. The wires 7 can be arranged in symmetry to the core 1 (diametrically) or may be spirally wound around the core 1.

As described by L. Goehlich, W. Rungseevijitprapa and H. Vemmer in "Wassermonitoring-System für VPE-Hochspannungskabel" in Elektrizitätswirtschaft, Jahrgang 97 (1998), Heft 1-2, typically a water monitoring system for the detection and locating of insulation errors as shown in FIG. 4 can be provided. A simple electric method is used in which a DC voltage is applied between the water sensor 7 and the cable screen 5 and a current flow is generated between the cable screen 5 and the water sensor 7 if there is a water intrusion. Furthermore, the system can measure DC currents between a water sensing wire 7 and the screen 5 of an adjacent cable in order to provide various measurement values for the water intrusion. Whilst a single water sensing wire 7 is sufficient, FIG. 3 shows a configuration where two water sensing wires 7 are used for redundancy purposes.

FIG. 5 shows a typical connection of the cables at a cross-bonding location where the cross-bonding is performed by connecting cross-bonding connection wires SCBCR, SCBCS, SCBCR with the screens 5 of the left-hand side cables L1, L2, L3 and the screens 5' of the right-hand side cables L1', L2', L3' in respective connectors (joints) CC1, CC2, CC3. These cross-bonding connection wires are then led to a cross-bonding device SCBD where the actual cross-bonding is carried out. Whilst in FIG. 5 the cross-bonding is carried out with respect to a joint where three first section cables L1, L2, L3 and three second section cables L1', L2', L3' are connected at their conductors 1, the cross-bonding location need not necessarily be at these conductor joint connectors. Alternatively, the cables can be connected arbitrarily at joints in accordance with the cable length requirements and the cross-bonding can be carried out by opening only the cable insulation and performing the cross-bonding independently of the mechanical connection of the conductors at the joints.

As shown in FIG. 5 and FIG. 3, at the connectors and in fact throughout the entire extension of the cable arrangement the water sensing wires 7 (two are shown as an example in FIG. 5) run parallelly to the conductor 1 and simply run through the respective joints. The cross-bonding of the screens is carried out such that the screen of cable L1 in section FCS is connected with the screen of the cable L1' in section SCS and the screen of cable L1' in section SCS is connected with the screen of cable L1" in section TCS e.g. at respective joints or elsewhere along the extension of the cable allows, to add up the induced voltages thus preventing currents and losses in the screen. However, also in the water sensing wires 7 voltages are induced by the currents in the conductor. To not destroy the insulation of the water sensing wires (as shown in FIG. 3 the water sensing wire is a Cu-wire with a polymer insulation) and the outer water sensing circuitry (see FIG. 4) the inventors have recognized that the difference voltages between the cable screen and the water sensing wire should not exceed some 10 V. The causes of such difference voltages between the cable screen and the water sensor are:

induction voltage as a result of the rated current in the conductors of the cables;

induction voltage as a result of a short circuit current in the conductor; and travelling waves caused by lightning when there is a connection to overhead wires.

Whilst such induced voltages and the electrical losses as a result of the electrical properties of the screen are small when using short cable connections and cables with small conductor cross sections (the difference voltage between the screen and the water sensing wire is small) the inventors have recognized that significant difference voltages between the screen and the water sensor occur at great length of the cables, even if the losses in the screen with grounding the screens at both ends (see FIG. 1) are prevented by the cross-bonding of the screens. In particular at the joints (connectors) large voltages occur with respect to the water sensing wires. Furthermore, of course induced voltages on the water sensing wires cause incorrect measurement results in the water monitoring system and may even lead to a damage of components therein.

To prevent a countermeasure against induced voltages on the water sensor wires, conventionally additional components like excess voltage protectors in the form of semiconductor switching elements (e.g. TRIACS or thyristers) are used. However, such excess voltage protectors can only prevent excess voltages of short duration with limited power.

SUMMARY OF THE INVENTION

As described above, even if the connectors (joints) are well designed to minimize as much as possible the generation of induced voltages on the water sensing wires and even when using excess voltage protectors, there still exists the problem of the generation of high difference voltages between the water sensors and other parts of the cable, e.g. the screen, which cannot be satisfactorily be avoided with conventional excess voltage protectors, in particular at great length of the cable arrangement.

Therefore, the object of the invention is to provide
a three-phase high voltage cable arrangement in which high difference voltages between the water sensing wires and other parts of the cable are avoided without using additional components like excess voltage protectors.

SOLUTION OF THE OBJECT

This object of the invention is solved by a three-phase high voltage cable arrangement for transmitting power from a first location to a second location including a first, second and third high voltage cable, each high voltage cable having a conductor and a screen wherein the screens are cross-bonded twice over said distance at particular cross-bonding locations to cancel out the screen voltages, wherein said first, second and third cable each comprise at least one water sensing wire for sensing water intrusion into the respective cable and said water sensing wires are cross-bonded twice over said distance at said cross-bonding locations wherein the cross-bonding of the water sensing wires is performed in the same cyclic order as the cross-bonding of the screens to cancel out difference voltages between the water sensor wires and the cable screens.

According to the invention, in a cable arrangement with cables including water sensors e.g. in the cable screen and with cyclically cross-bonded cable screens, it is suggested to cross-bond the water sensor wires in the same cyclic order as the cable screens. If the water sensors are cross-bonded in the same manner as the screens difference voltages can be completely avoided between the water sensing wires and the screen.

The cross-bonding locations can be arranged at the joints or anywhere along the extension of the cable arrangement where the cable coating is opened for cross-bonding. Preferably, at each cross-bonding location a first, second and third pair of water sensing wire cross-bonding connection cables are connected with the respective water sensing wires and a first, second and third screen cross-bonding connection cable is connected with the respective screens of the respective cables. The water sensing wire cross-bonding connection cables and the screen cross-bonding connection cables are preferably connected with a water sensing wire cross-bonding device and a screen cross-bonding device.

The water sensing wire cross-bonding device and the screen cross-bonding device can be arranged into different cross-bonding boxes or in a single common cross-bonding box.

Further advantage embodiments and improvements of the invention can be taken from the dependent claims. Furthermore, it should be noted that the invention can comprise embodiments which result from a combination of features separately described in the specification and/or claimed in the claims.

BRIEF DESCRIPTION OF THE DRAWINGS

FIG. 9b shows a side view of the water sensing wire cross-bonding device shown in FIG. 9a;

In the drawings the same or similar reference numerals denote the same or similar parts throughout.

PRINCIPLE OF THE INVENTION

Hereinafter, the principle of the invention will be described with reference to FIG. 6.

Figure 1:
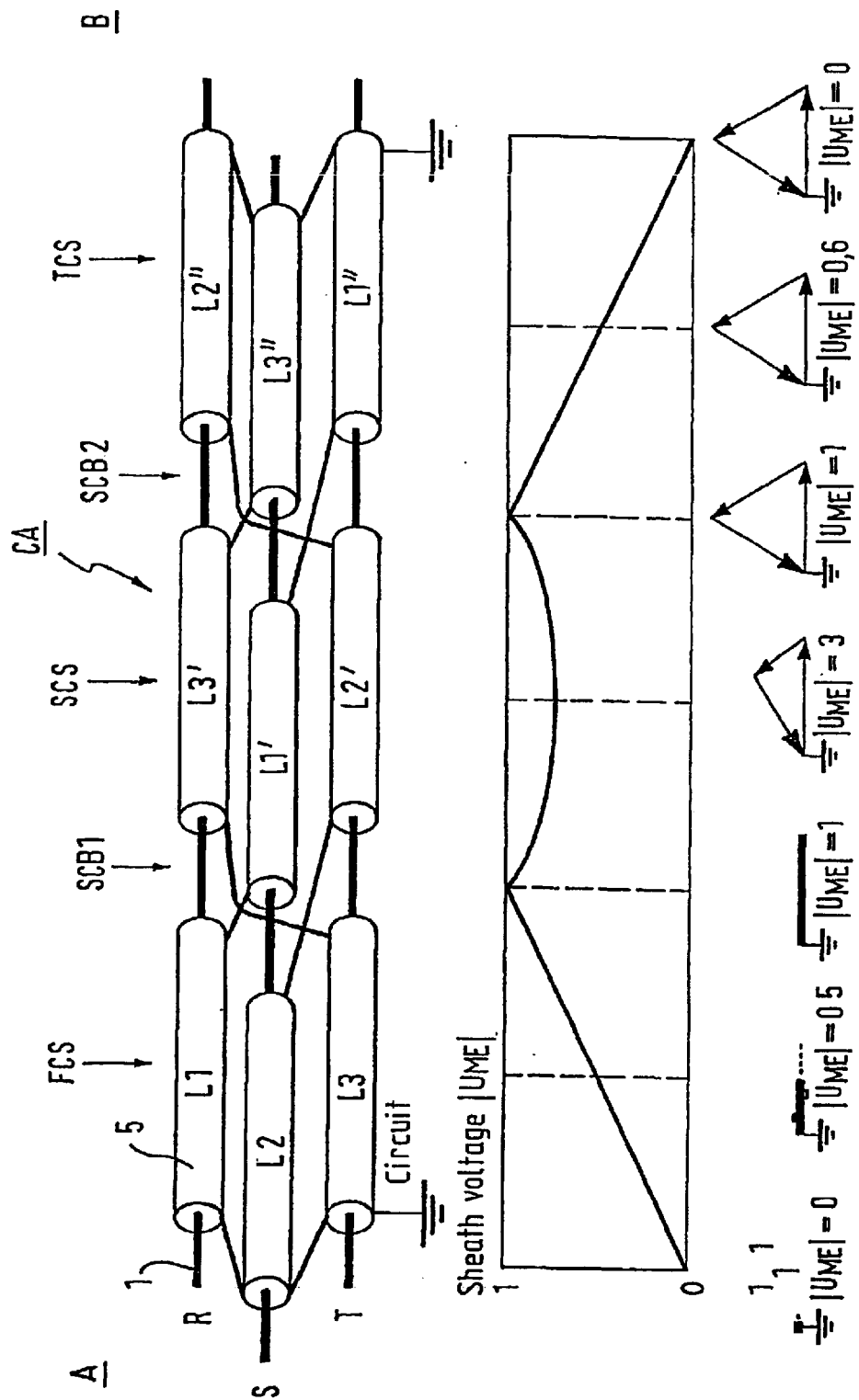
FIG. 1 shows a cable arrangement where a cross-bonding of screens is performed at two screen cross-bonding locations according to the prior art.
Figure 2:
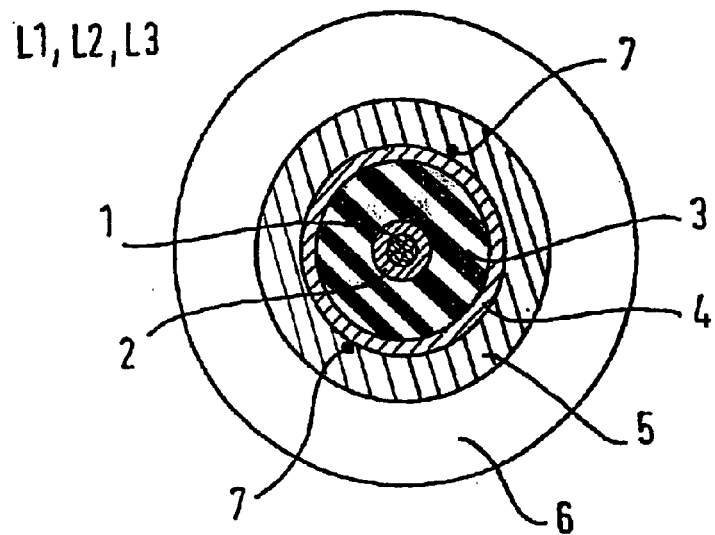
FIG. 2 shows a principle cable construction of the cables shown in FIG. 2, in particular incorporating water sensing wires embedded in the screen.
Figure 6:
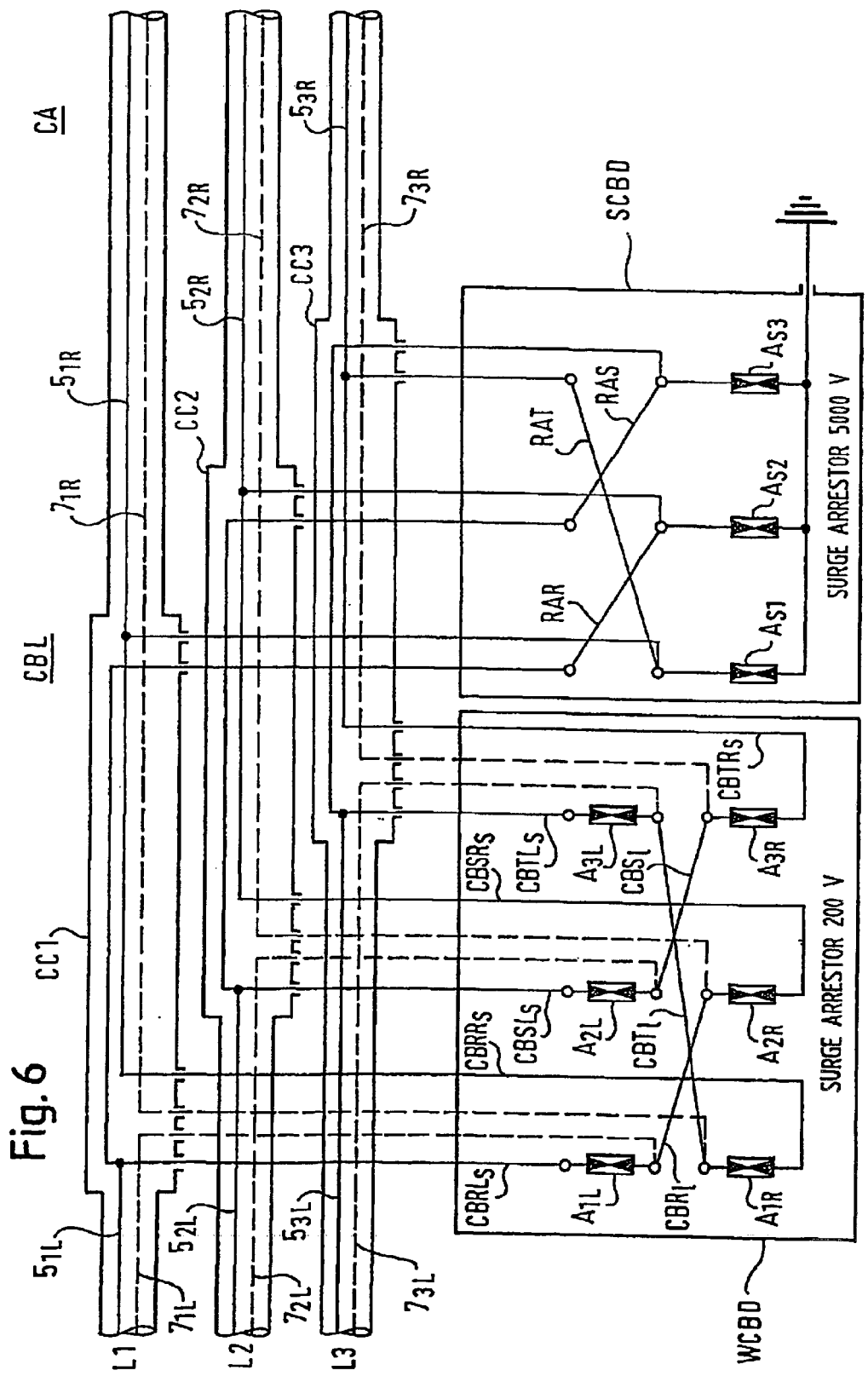
FIG. 6 shows a circuit diagram for performing a cross-bonding of cable screens as well as water sensing wires at a cross-bonding location.

In FIG. 6 a cross-bonding location CBL of the inventive cable arrangement CA is shown. Such a cross-bonding location corresponds to the screen cross-bonding locations SCB1, SCB2 shown in FIG. 1. The cable arrangement CA comprises first, second and third high voltage cables L1, L2, L3 and each high voltage cable has a conductor (not shown), a screen 5 and at least one water sensing wire 7. As explained above with reference to FIG. 3, of course, several water sensing wires 7 can be provided in each cable, however, for a better overview of the cross-bonding only one single water sensing wire 7 is respectively illustrated.

Furthermore, of course, it will be appreciated that the corresponding location CBL where the water sensing wires and the screens are both cross-bonded in the same cyclic order is provided twice along the distance between the first location A and the first location B. Furthermore, as also explained above, the cross-bonding location CBL may be arranged at the respective joint where the conductors are joined or can be located anywhere along the length of the cables in which case the outer coating and respective other layers of the cable construction is opened to allow access to the water sensing wires and the screens.

At the cross-bonding location CBL the screens as well as the water sensing wire of the respective cable L1, L2, L3 are separated in order to allow the cross-bonding. Thus, at the cross-bonding location CBL the first cable Li has on the left side a first left screen $5_{1L}$ and a first left water sensing wire $7_{1L}$ and on the right side a first right screen $5_{1R}$ and a first right water sensing wire $7_{1R}$. Similarly, the second cable $L_2$ has a second left and second right screen $5_{2L}$, $5_{2R}$ and a respective second left and right water sensing wire $7_{1L}$, $7_{2R}$. The third cable L3 has respective screens $5_{3L}$, $5_{3R}$ and water sensing wires $7_{3L}$, $7_{3R}$. A wire cross-bonding device WCBD is provided for performing the cross-bonding of the water sensing wires and a screen cross-bonding device SCBD is provided for performing the conventional screen cross-bonding.

As shown in FIG. 6, in the wire cross-bonding device WCBD the left first wire $7_{1L}$ is connected with the second right wire $7_{2R}$. The second left wire $7_{2L}$ is connected with the third right wire $7_{3R}$. The third left wire $7_{3L}$ is connected with the first right wire $7_{1R}$. Preferably, to add further protection, surge arrestors $A_{1L}$, $A_{2L}$, $A_{3L}$, $A_{1R}$, $A_{2R}$, $A_{3R}$ are provided between the respective wires $7_{1L}$, $7_{2L}$, $7_{3L}$ and the screens $5_{1L}$, $5_{2L}$, $5_{3L}$ and the wires $7_{1L}$, $7_{2L}$, $7_{3R}$ and the screens $5_1R$, $5_2R$, $5_3R$. Such arrestors can be surge arrestors for 200V.

In the screen cross-bonding device SCBD the first left screen $5_{1L}$ is connected with the second right screen $5_{2R}$, the second left screen $5_{2L}$ is connected to the third left screen $5_{3L}$ and the third right screen $5_{3R}$ is connected to the first right screen $5_{1R}$. Arrestors $A_{S1}$, $A_{S2}$, $A_{S3}$ can preferably be connected as additional protection devices between the first right screen $5_{1R}$, $5_{2R}$, $5_{3R}$ and ground. Such arrestors can be surge arrestors for 5000V.

As can be seen from FIG. 6, according to the principle of the invention, the water sensing wires 7 are cross-bonded in the same cyclic order as the cross-bonding of the screens. By this measure no difference voltage occurs between the individual parts of the cables L1, L2, L3, e.g. between the sensing wires 7 and the screens 5.

First Embodiment

Figure 7:
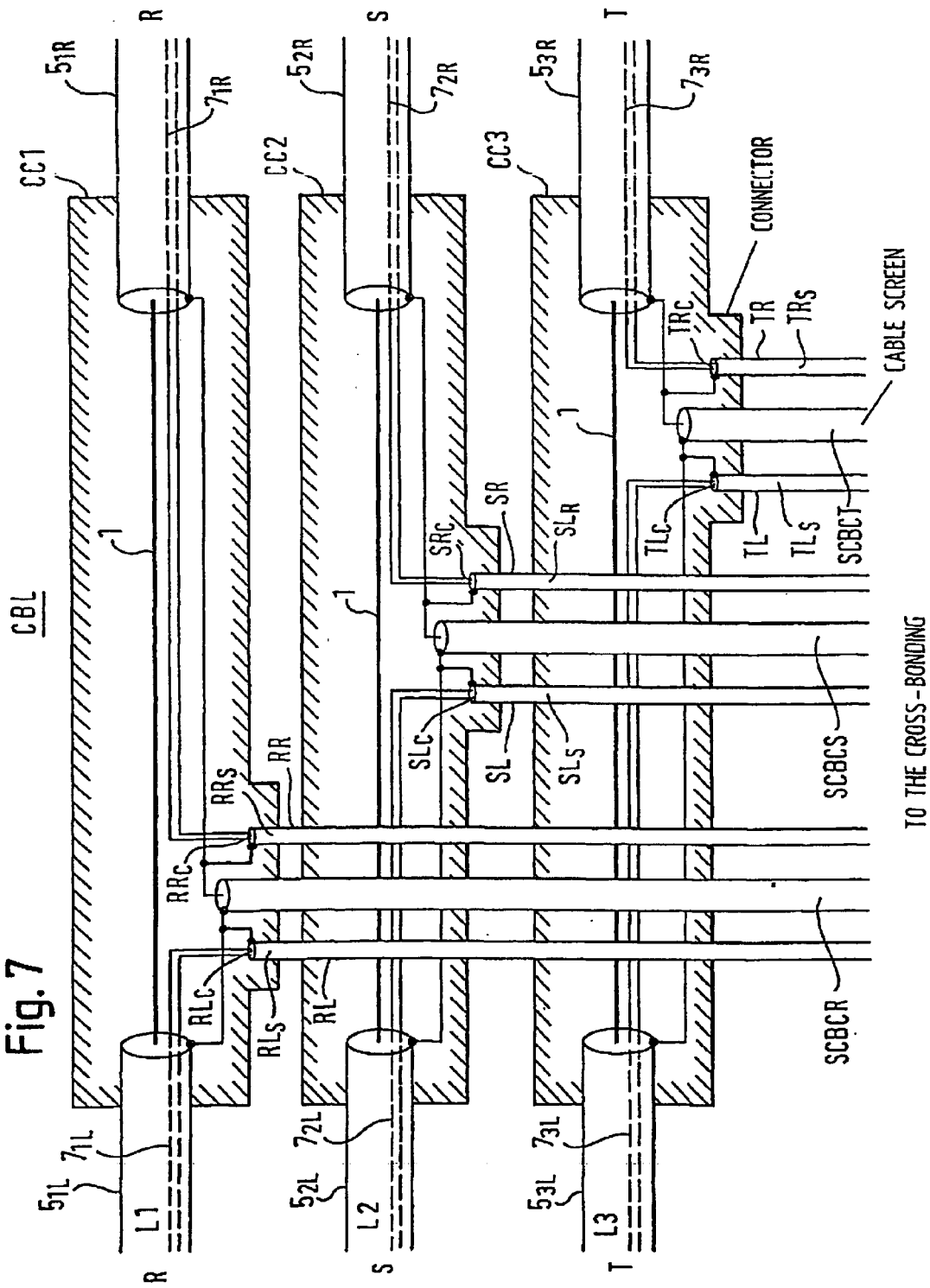
FIG. 7 shows a similar diagram as in FIG. 5, however comprising additional water sensing wire cross-bonding connection cables.

FIG. 7 shows a first embodiment of the invention where the cross-bonding in accordance with FIG. 6 takes place at a joint where the three cables L1, L2, L3 are joined at their conductors 1. R, S, T in FIG. 7 respectively correspond to the R, S, T phase of the three-phase cable arrangement CA.

The designations of the screens 5 and the wires 7 correspond to those shown in FIG. 6. In FIG. 7 the joint is made of three connection parts CC1, CC2, CC3 which can be part of the joint for joining the conductors 1. However, it should be understood that the cross-bonding location CBL shown in FIG. 7 may also be located elsewhere along the line, i.e. not at a joint but at a location where the outer coating of the respective cables L1, L2, L3 is opened to allow the connection of the connection cables SCBCR, SCBCS, SCBCT.

In FIG. 7 the first screen connection cable SCBCR has its conducting layer connected to the first left screen $5_{1L}$ and its core conductor connected to the first right screen $5_{1R}$. The second screen connection cable SCBCS has in a similar fashion connected its conducting layer to the second left screen $5_{2L}$ and has its core conductor connected to the second right screen $5_{2R}$. Furthermore, the third screen connection cable SCBCT has its conducting layer connected to the third left screen $5_{3L}$ and its core conductor connected to the third right screen $5_{3R}$.

In addition, there are provided three pairs of wire connection cables RL, RR; SL, SR; TL, TR. A first wire connection cable RL of the first pair has its core conductor connected to the first left wire $7_{1L}$ and has its conducting layer $RL_s$ connected to the first left screen $5_{1L}$. The second wire connection cable RR of the first pair has its core conductor $RR_c$ connected to the first right wire $7_{1R}$ and has its conducting layer $RR_s$ connected to the first right screen $5_{1R}$. In the same manner the first and second wire connection cable SL, SR are connected to the second left screens and wires and to the second right screens and wires. Likewise, the two wire connection cables TL, TR are respectively connected to the third left screens and wires and to the third rights screens and wires of the third cable L3. The first, second and third pair of water sensing wire connection cables and the first, second and third screen connection cables SCBCR, SCBCS, SCBCT are connected with a cross-bonding device. As will be explained with further details below, the cross-bonding device can be provided in two separate cross-bonding boxes for respectively cross-bonding of the water sensing wires and of the screens. Alternatively, a single cross-bonding box can be used to perform simultaneously the water sensor wire cross-bonding and the screen cross-bonding which improves the impedance matching. This will be explained below with reference to the embodiments in FIGS. 8–10.

The connection cables RL, RR; SL, SR; TL, TR; SCBCR, SCBCS, SCBCT can be coaxial cables. Preferably, the coaxial cables should have a conductor core which has the same wave impedance as the water sensing wires and the screens, respectively. By this measure, travelling waves on the cable screen are not reflected with respect to the water sensing wire and there will not be generated an excess voltage between the strands of the cable.

Second Embodiment

Figure 8:
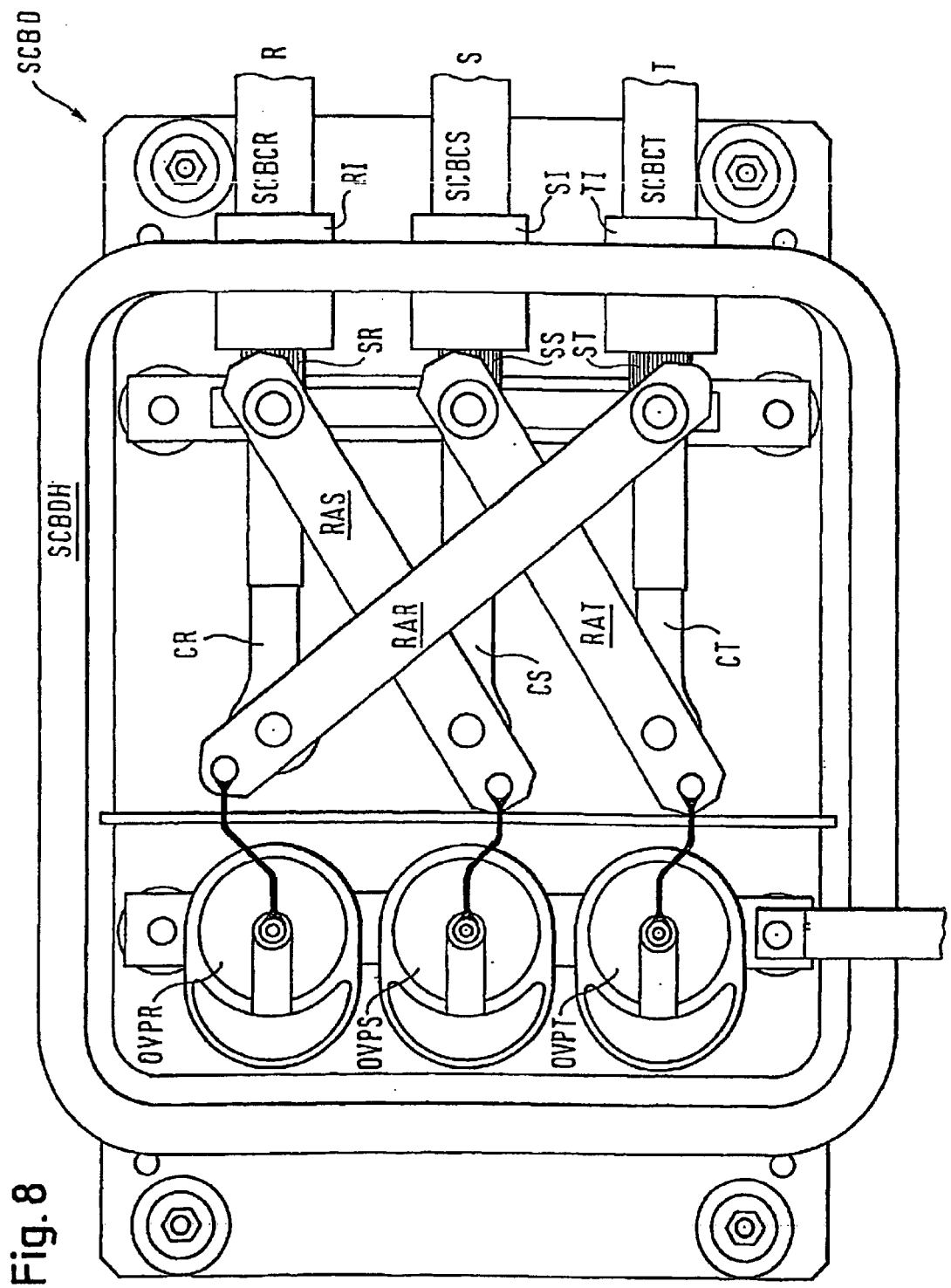
FIG. 8 shows a screen cross-bonding device for cross-bonding of the screens.

FIG. 8 shows an embodiment of the screen cross-bonding device SCBD for performing the cross-bonding of the screens of the three cables L1, L2, L3. AS shown in FIG. 8, the screen cross-bonding device SCBD has the form of a box including a housing SCBDH and insertion parts RI, SI, TI into which the respective screen cross-bonding connection cables SCBCR, SCBCS, SCBCT are inserted, e.g. clamped or otherwise fixed. On the inside of the housing CBDH the conductor cores CR, CS, CT and the screens or conducting layers SR, SS, ST are exposed. Furthermore, connection rails RAR, RAS, RAT are provided to connect the conductor cores CR, CS, CT and the screen SR, SS, ST as principally indicated in the circuit diagram in FIG. 6.

That is, a first rail RAR connects the conductor core CR with the screen ST of the third cable SCBCR. The second rail RAS connects the second core conductor CS of the second cable SCBCS with the screen SR of the first cable SCBCR. Furthermore, the third connection rail RAT connects the third core conductor CT of the third cable SCBCR with the screen SS of the second connection cable SCBCS.

Figure 3:
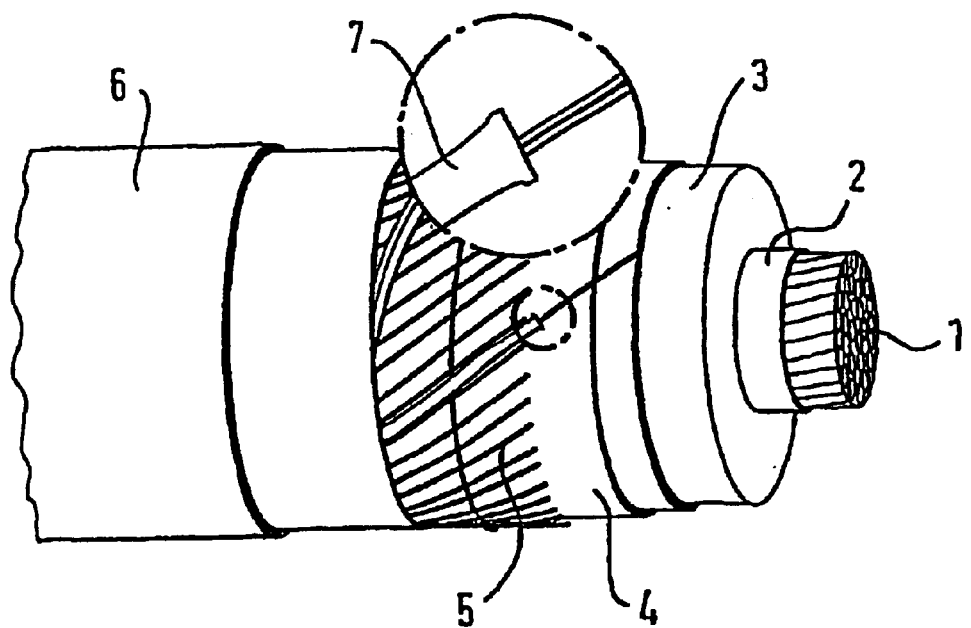
FIG. 3 shows a cable construction as in FIG. 2, in particular the provision of two water sensing wires arranged between the wires of a screen.
Figure 4:
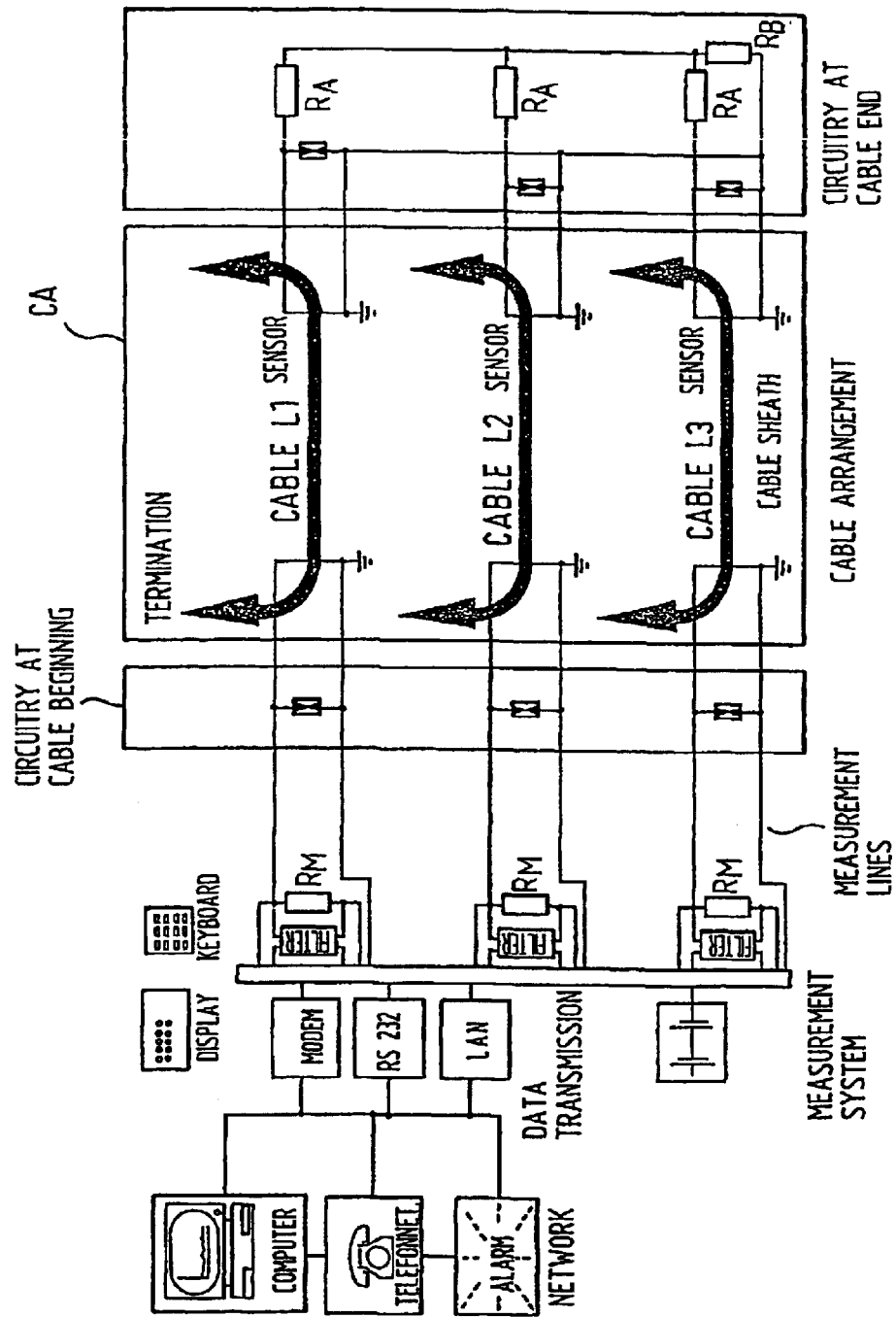
FIG. 4 shows a block diagram of a water monitoring system according to the prior art.
Figure 5:
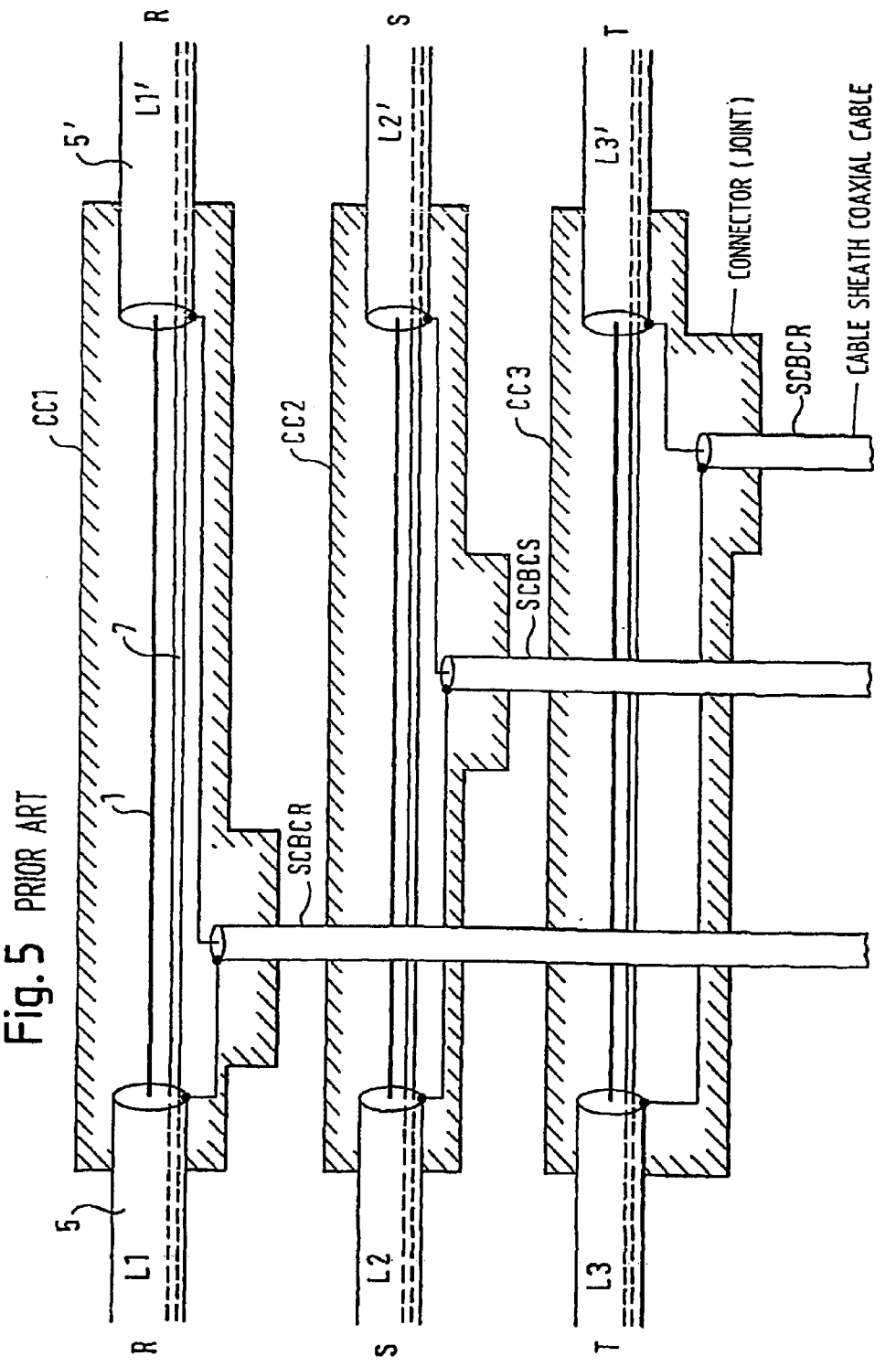
FIG. 5 shows the connection of screen cross-bonding connection wires at respective joints of the screen-cross-bonding locations shown in FIG. 1.

The first, second and third rails RAR, RAS, RAT can have the form of elongated plates and are preferably made of Cu. The plates are further connected with high voltage protectors OVPR, OVPS, OVPT which are connected to ground at the other terminals (not shown in FIG. 8). These overvoltage protectors correspond to the search arrestors $A_{S1}$, $A_{S2}$, $A_{S3}$ shown in FIG. 6. The overvoltage protectors OVPR, OVPS, OVPT are provided in order to limit transient difference voltages between the screens and water sensing wires to a value below the breakdown voltage of the insulation of the water sensing wire. As shown in FIG. 3, the water sensing wire is surrounded by a particular insulation layer.

The individual connection plates for connection rails RAR, RAS, RAT in the connection box SCBD have a withstand voltage with respect to each other and with respect to the environment which is larger than the break down voltage of the sheath voltage limiters as well as the test voltage to measure the tightness of the sheath which is in the range of some 1000V. A typical voltage for the DC voltage test regarding the tightness of the sheath is 5 kV. In this connection it should also be noted that the connection cables RL, RR; SL, SR; TL, TR; SCBCR, SCBCS, SCBCT needed for the connection between the cables and the cross-bonding box have a withstand voltage which is same as the connection rails RAR, RAS, RAT.

Third Embodiment

Figure 9A:
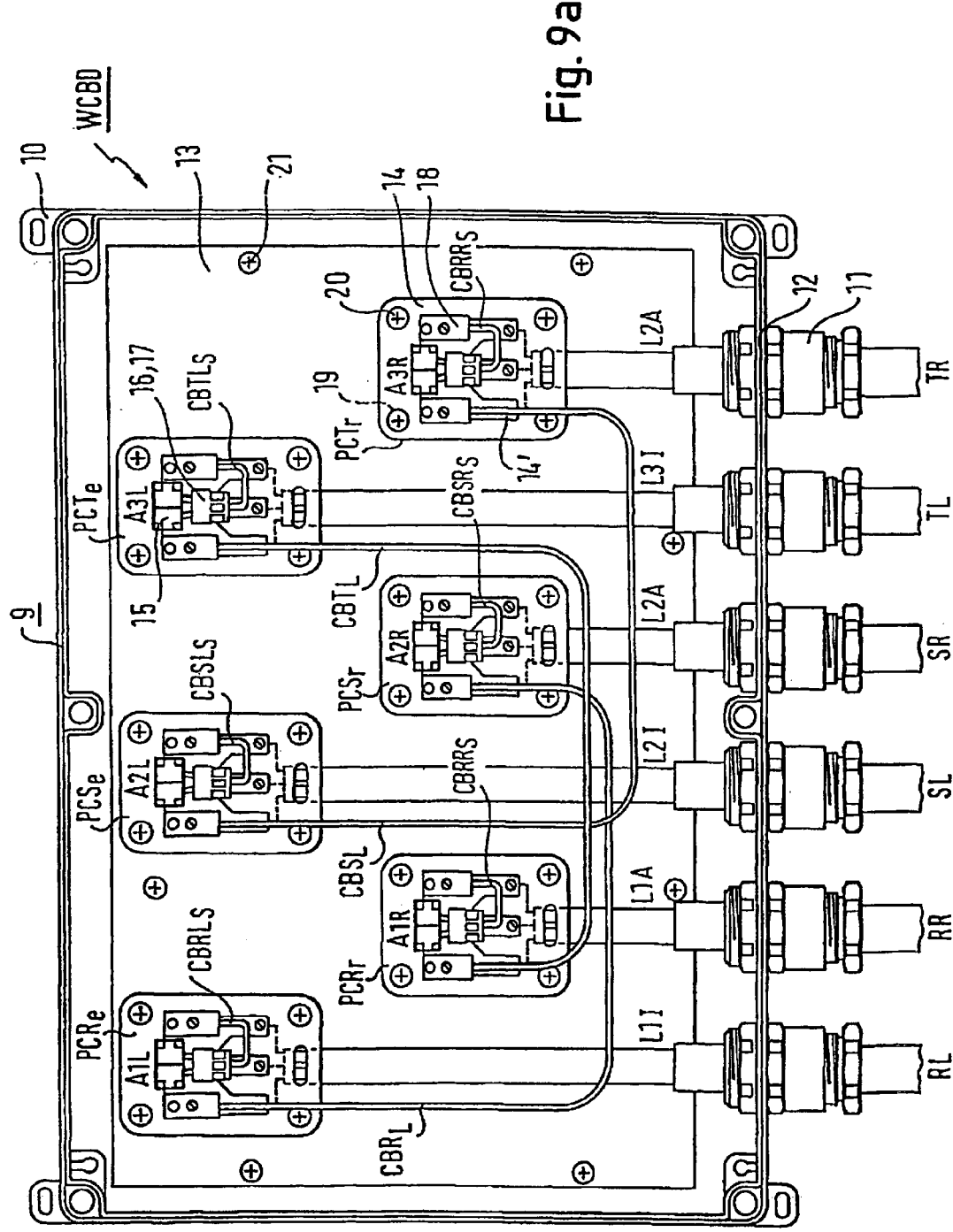
FIG. 9a shows a top view of a water sensing wire cross-bonding device for cross-bonding of the water sensing wires.
Figure 9B:
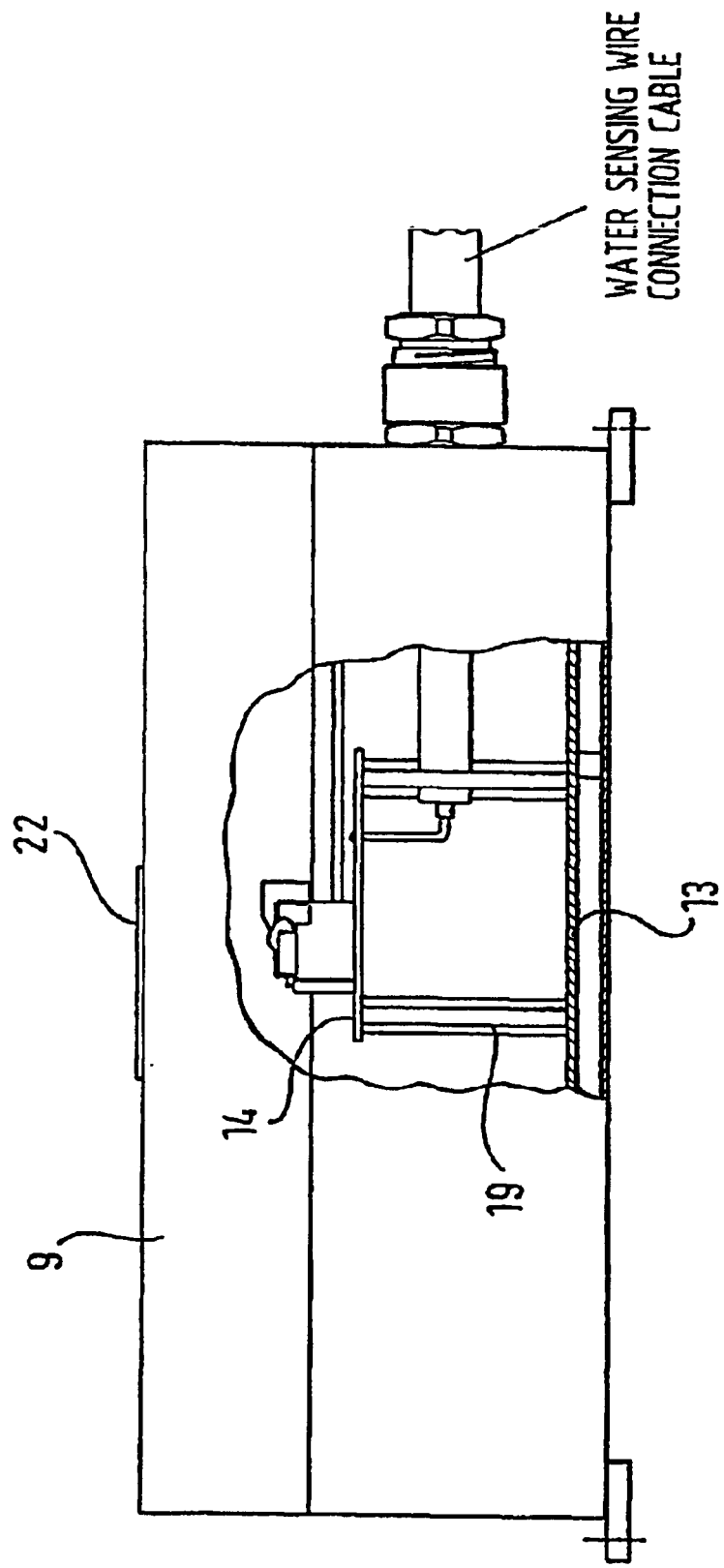

FIG. 9a shows an embodiment of the wire cross-bonding device WCBD as schematically indicated in FIG. 6. FIG. 9a is the top view and FIG. 9b is a cross-sectional view seen from the left in FIG. 9a.

The wire cross-bonding device WCBD has the form of a box and receives the water sensor wire cross-bonding connection cables RL, RR; SL, SR; TL, TR. These cables are fixed at the housing 9 by means of a screw 11 and a nut 12. Each cross-bonding connection cable is fed inside the housing 9 to a respective plate connector $PCR_e$, $PCS_e$, $PCT_e$; $PCR_r$, $PCS_r$, $PCT_r$ each including a conductor board 14, e.g. a printed circuit board PCB. The printed circuit board 14 is elevated from the ground by means of the screws 20 and distance elements 19 shown in FIG. 9b.

The printed circuit board 14 carries two clamps 18, the excess voltage protectors 15 (more precisely the excess voltage protectors $A_{1L}$, $A_{2L}$, $A_{3L}$; $A_{1R}$, $A_{2R}$, $A_{3R}$ as shown in FIG. 9a), a short-circuit plug including a socket 17 and short and long cross-bonding wires $CBR_L$. $CBS_L$, $CBT_L$; $CBR_S$, $CBS_S$, $CBT_S$ are respectively connected with the left and right clamps 18. The cross-bonding wires correspond to the interconnections shown in FIG. 6. The bottom mounting board 13 is mounted to the housing bottom wall by means of screws 21. As shown in FIG. 9b, the housing 9 has a removable cover which carries a specification plate 22.

As shown in FIG. 9a, the short and long cross-bonding wires are respectively connected with the left and right clamps 18 mounted on the PCB 14. These cross-bonding wires are permanently fixed in the cross-bonding device WCBD and during the mounting of the cross-bonding connection cables RL, RR; SL, SR; TL, TR, the respective ends of the conductor cores $RL_C$, $RR_C$; $SL_C$, $SR_C$; $TL_C$, $TR_C$ (see FIG. 7) and the respective screens $RL_S$, $RR_S$; $SL_S$, $SR_S$; $TL_S$, $TR_S$, are soldered at the solder points for the water sensor and the solder points for the screen on the respective circuit boards 14. Since the circuit board 14 is elevated from the bottom wall of the housing 9 as shown in FIG. 9b, the respective core conductors and screens are fed to the board 14 from below and are then soldered on the top surface of the printed circuit board. As indicated with the reference numeral 14' the printed circuit board 14 carries a conductor pattern 14' which allows to make contact between the respective core conductors and screens and the respective clamps 18 and thus with the short and long cross-bonding wires.

Of course, during the mounting of the cross-bonding connection cables the order of the cables must be observed in order to achieve the electrical connection as shown in FIG. 6. However, otherwise only the soldering of the respective core conductors and screens must be performed to the circuit board 14 which thus enables a very quick and easy connection of the water sensing wire cross-bonding device WCBD to the cross-bonding connection cables.

As shown in FIG. 9a, the connection board (printed circuit board) 14 is equipped with a plug terminal which allows the connection of the screen and the respective conductor cores. However, it also allows the connection of measurement equipment such that the electrical characteristics of the respective water sensing wires can be determined before a special selection of one or more of the water sensors.

The embodiment shown in FIG. 9a of the water sensing wire cross-bonding device WCBD into which the cross-bonding connection cables shown in FIG. 7 are inserted is usable for a water sensing system where only a single water sensing wire per cable L1, L2, L3 is employed. In this case the respective cross-bonding connection cables can be coaxial cables such that in the cross-bonding box WCBD only six coaxial cables are supplied. In this case, the water sensing wires in the joints CC1, CC2, CC3 are also connected with coaxial cables. The outer conducting layer of the coaxial cables are connected with the cable screen and the conductor core of the coaxial cable is connected with the water sensing wire. Thus, per joint CC1, CC2, CC3 there is one coaxial cable for the screens and two coaxial cables for the respective left and right water sensing wires as shown in FIG. 7. A special embodiment of such a joint will be discussed below with reference to FIG. 11.

Comparing the screen-cross-bonding device SCBD in FIG. 8 with the water sensing wire cross-bonding device DCBD in FIG. 9a it is quite clear that the cross-bonding wires in FIG. 9a only require a small cross-section and a small insulation to carry short-circuit currents since lower difference voltages of ≈200V may occur whilst the cross-bonding rails RAR, RAS, RAT in FIG. 8 need a large cross-section for large short-circuit currents due to the higher voltages of ≈5000V.

Furthermore, it should be noted that the cross-bonding device WCBD in FIG. 9a is especially provided for a high voltage cable system with three cables L1, L2 and L3 which have a screen and two water sensing wires 7 are diametrically arranged. In this case, the cross-bonding connection cables are cables having a screen and insulation and two conductor cores to which the respective water sensing wires and the screen of the respective cable is connected. The cross-bonding device WCBD can then be used for the two water sensors, i.e. the two conductor cores of the cross-bonding connection cables are soldered at the respective two solder points on the printed circuit board 14 as shown in FIG. 9a and can then be selected as described above. In the respective plate connectors $PCR_L$, $PCS_L$, $PCT_L$; $PCR_R$, $PCS_R$, $PCT_R$ the respective cross-bonding wires have the following assignment of the wires for the cross-bonding as shown in table 1 below:

TABLE 1

| Joint left Joint Coaxial cable Conductor | | | Joint right Coaxial cable Conductor | | |
|---|---|---|---|---|---|
| | screen | core | Joint | screen | core |
| L1 | Inside | L1 I | L2 | Outside | L2 A |
| L2 | Inside | L2 I | L3 | Outside | L3 A |
| L3 | Inside | L3 I | L1 | Outside | L1 A |

In table 1 the designations of L1 I, L2 I, L3 I denote the inner connection and L1 A, L2 A, L3 A denote the outer connection. Inner and outer connection are related to the inner and outer conductor of the coaxial cross bonding cable of the cable screen. The wire designations L1 I, L2 I, L3 I; L1 A, L2 A, L3A respective denote the first and second core conductor of the cross-bonding connection tables RL, RR; SL, SR; TL, TR as principally indicated in FIG. 7. Thus, the cross-bonding connection cables are connected with the respective printed circuit board 14 at the respective solder points such that the sensor connection cables are connected at the screen and at the wire with a respective overvoltage protector $A_{1L}$, $A_{2L}$, $A_{3L}$; $A_{1R}$, $A_{2R}$, $A_{3R}$ through the plug and socket arrangement 16, 17. After selection of the sensor, the non-used sensor is bridged with a prepared connection line. Because one sensor is for redundancy, the used (active) sensor has to be chosen by means of an electric measurement. The non-used (non-active) sensor has to be connected with the respective cable screen to avoid potential differences. Then, the cross-bonding wires will allow a cross-bonding of the water sensing wires, i.e. the selected cross-bonding wires. Thus, the cross-bonding device WCBD can be used for the selection of one of two water sensing wires and one can select it without any danger of confusion. Since solder connections are used with respect the plate connectors PCR, the cross-bonding connection cables can also be easily removed and for the aim of any HV DC test new cables can be mounted without any risk of confusion.

Finally, it should be noted that in FIG. 9a only six plated connectors are shown for allowing a selection of one of the two water sensors. However, it is of course possible that the plate connectors are configured to only have a single solder point on the printed circuit board 14 such that cables with only one water sensing wire can be cross-bonded. On the other hand, of course it is possible to configure the plate connectors in such a manner that also more than two water sensing wires can be cross-bonded. Depending on the number of water sensing wires to be cross-bonded, the number of plate connectors and the number of cross-bonding wires can also be correspondingly increased.

Fourth Embodiment

Figure 10:
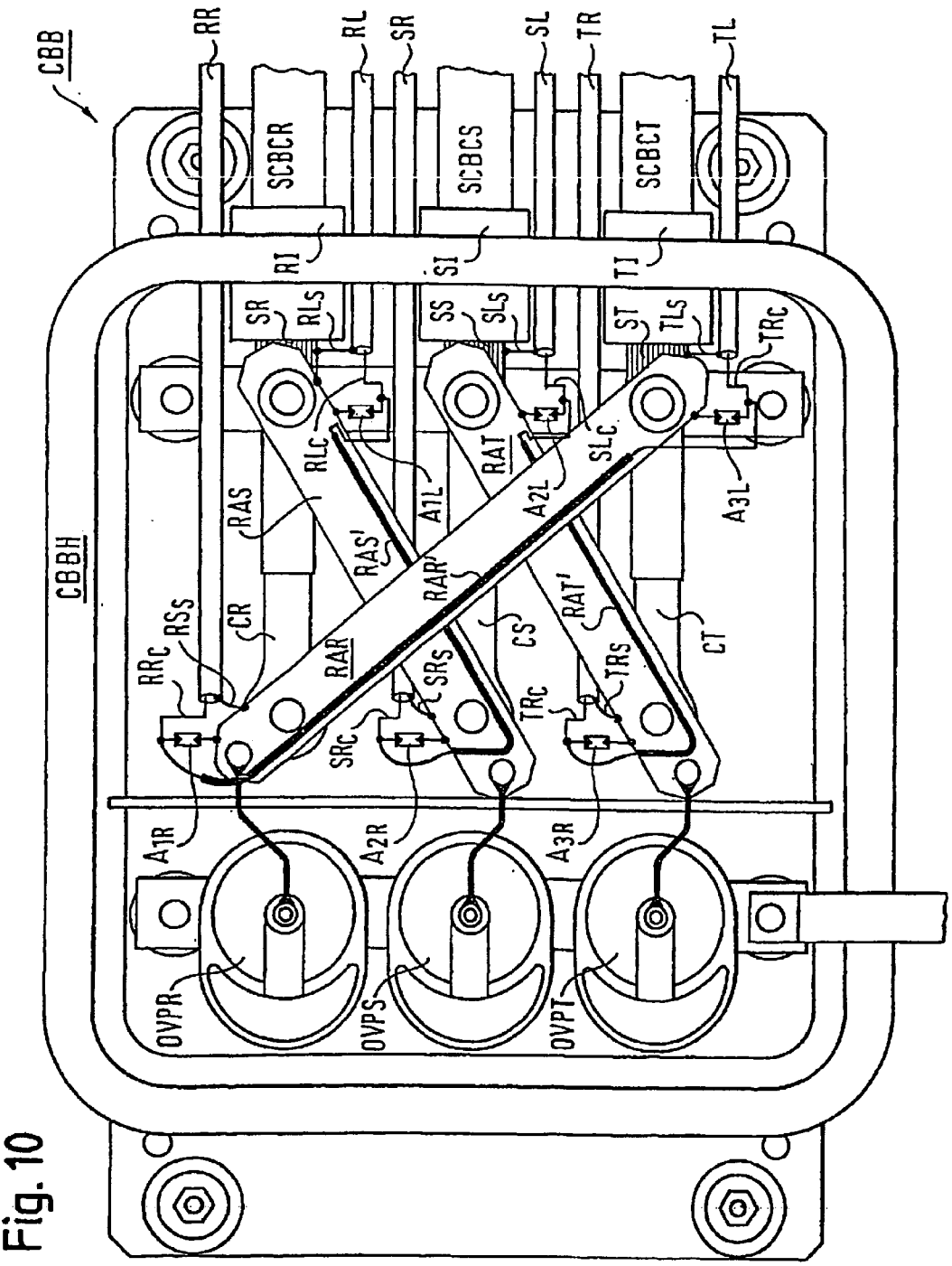
FIG. 10 shows a cross-bonding box used for performing a cross-bonding of the water sensing wires as well as the screens of the cables.

FIG. 10 shows a further embodiment of the cross-bonding device similar to FIG. 8, However, the cross-bonding device CBD in FIG. 10 is not only used for the cross-bonding of the screens as was explained with reference to FIG. 8, but also for the cross-bonding of a single water sensing wire in each cable, L1, L2, L3. In FIG. 10 the designations correspond to the designations used in FIG. 8 and in FIG. 6. Thus, the cross-bonding device CBD has a housing SBDH to which not only the screen cross-bonding connection cables SCBCR, SCBCS, SCBCT are inserted, but through which also the water sensing wire cross-bonding connection cables RR, RL; SR, SL; TR, TL are inserted.

The connection plates or connection rails RAR, RAS, RAT additionally carry a cross-bonding wire RAR', RAS', RAT' which perform the same function as the cross-bonding wires in FIG. 9a. In FIG. 10, the water sensing wire cross-connection cables are preferably coaxial cables having a screen and core conductor as shown in FIG. 7. Each core conductor $RR_C$, $SL_C$, $TR_C$ of the left hand side coaxial cable is connected to the respective connection line RAR', RAS', RAT' provided in an insulated manner on the connection rails RAR, RAS, RAT. The respective screen $RS_S$, $SR_S$, $TR_S$ are directly connected with the connection rails RAR, RAS, RAT, as shown in FIG. 10. The respective arrestors $A_{1R}$, $A_{2R}$, $A_{3R}$ are preferably connected between a respective core and screen. A similar connection is made on the other side of the connection line RAS', RAR', RAT' for the left hand side coaxial cables. That is, the conductor cores $RL_C$, $SL_C$, $TL_C$ are directly connected with the other end of the connection cable RAS', RAR', RAT' and the screen $RL_S$, $SL_S$, $TL_S$ are respectively connected directly to the connection rails RAS, RAT, RAR. A respective arrestor $A_{1L}$, $A_{2L}$, $A_{3L}$ is again preferably connected between the respective screen and core conductor.

Thus, the cross-bonding device CBD in FIG. 10 directly achieves the cross-bonding for the single water sensing wire and the screens in a circuit connection as described in FIG. 6.

The primary advantage of using only one cross-bonding box CBB is that the water sensor wires are invariably cross-bonded in the same manner, electrically and mechanically, and that thus the cable resistances have approximately the same complex values such that excess voltages during fast electrical transient conditions can be avoided.

It should also be noted that the cross-bonding box CBB in FIG. 10 can be configured for coaxial cables having two or more core conductors for cross-bonding of two or more water sensing wires or for the selection of one of them. In this case, the cross-bonding rails RAR, RAS, RAT carry a plurality of connection cables which are respectively connected with the core-conductors of the respective water sensing wire cross-bonding connection cable.

Fifth Embodiment

Figure 11:
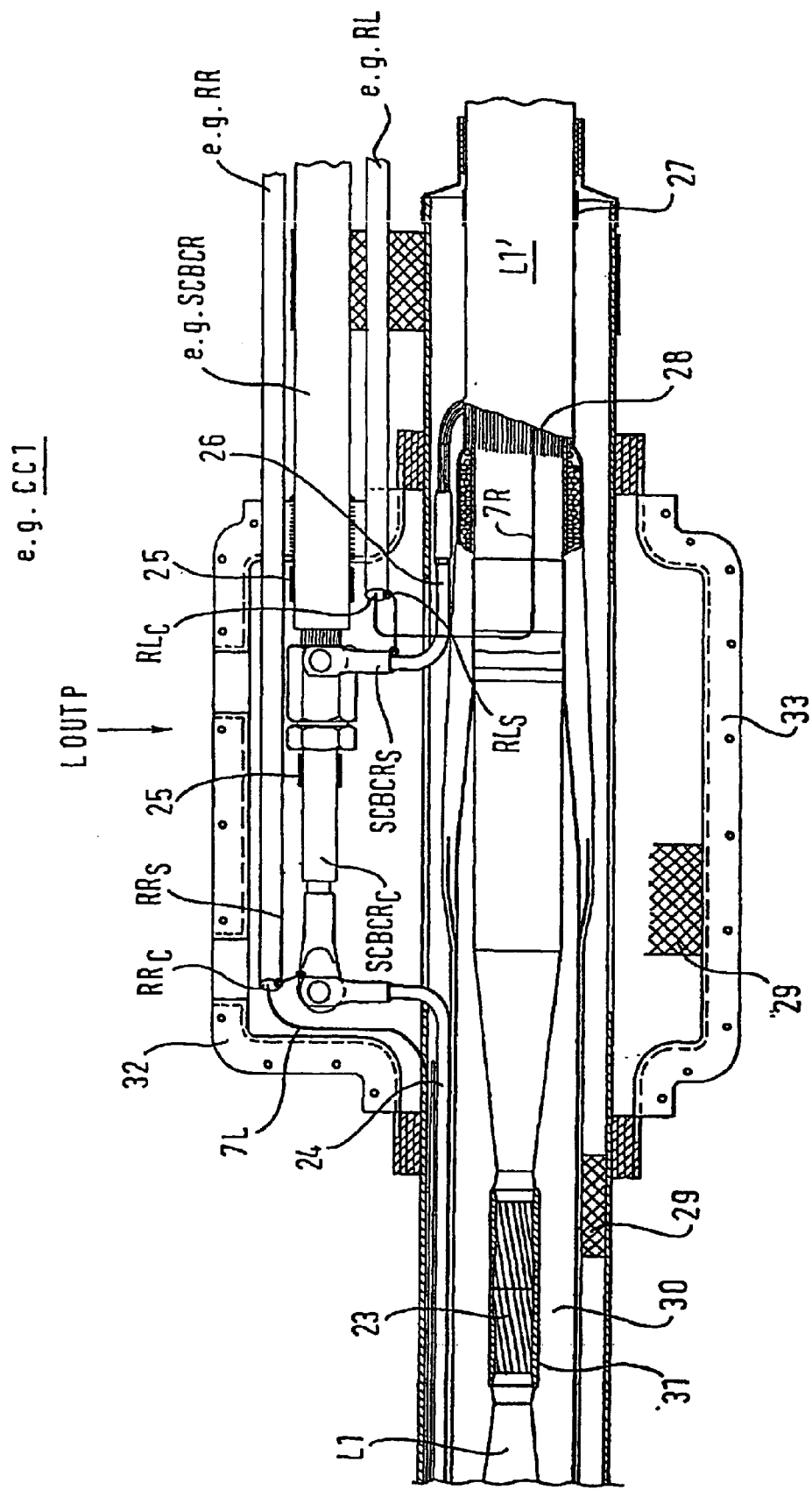
FIG. 11 shows a cross-bonding location with a device for leading out the screen cross-bonding and water sensing wire cross-bonding connection cables.

As already described for example with reference to FIG. 7, at each cross-bonding location CBL it is necessary to lead out the water sensing wires and the screens of the respective cable sections and to connect them to the respective coaxial cross-bonding connection devices. FIG. 11 shows an embodiment of a joint CC1, CC2, CC3 which is schematically illustrated in FIG. 7. That is, in FIG. 11 a cross-bonding location is in fact at a location where the conductor cores are joined as indicated with the reference numeral 23 in FIG. 11.

In FIG. 11 reference numeral 31 designates an outer layer of the conductor core connection, reference numeral 30 is a left joint, reference numeral 27 is a water proof tape, reference numeral 29 is a protoden resin, reference numeral 25 describes a water proof tape at the cross-bonding cable lead-out portion and reference numerals 32, 33 designate a holding bracket of the cross-bonding connection cable lead-out device LOUTD of the respective joint CC1, CC2, CC3.

As shown in FIG. 11, on the left-hand side, the left-hand side cable contains a left-hand side water sensing wire $7_1$ which is connected with the core $RR_c$ of the wire cross-bonding cable RR. The screen $RR_s$ of the wire cross-bonding cable RR is connected to an insulated copper conductor 24 provided on the left side within the cable construction. A screen cross-bonding connection cable SCBCR has its core SCBCRc connected to the insulated copper conductor 24. Likewise, the insulated copper conductor 26 from the right hand side cable L1' is connected to the screen $SCBCR_S$ through a screw connection.

A right-hand side water sensing wire $7_R$ is led out from the cable L1' and is connected with the core $RL_c$ of the wire cross-bonding connection cable RL. The screen $RL_s$ is connected to the right-hand side copper conductor 26. The outer brackets 32, 33, preferably a single bracket 32, 33 extending like a tube around the cable joint, has additional openings for the wire cross-bonding connection cables RR, RL to be led out together with the screen cross-bonding cable SCBCR parallelly. Of course, the joint CC1 shown in FIG. 11 is provided three times for allowing the respective connections of the cables of the R, S and T phase as shown in FIG. 7. Furthermore, it should be noted that of course it is also possible that the wire cross-bonding connection cables RR, RL in FIG. 11 have more than one core conductor for being connected with more than one water sensing wire although FIG. 11 only shows the connection for a single water sensing wire $7_L$, $7_R$ in the respective cable section.

INDUSTRIAL APPLICABILITY

According to the present invention a cable arrangement is provided in which the screen and the water sensing wires are on the same potential as much as possible in steady-state and transient conditions. Since the water sensing wires as well as the screens are cross-bonded in the same cyclic order potential differences between the screen and the water sensing wires are reduced. Furthermore, cross-bonding devices in accordance with the invention can be provided which enable to match impedances of the water sensing wire connections and the screen connections. Thus, the invention provides a cable arrangement which can avoid problems due to induction voltages caused by the rated current in the conductors, caused by short circuits in the conductors or caused by a lightning or other high voltage generating effects. Thus, the present invention can preferably be used in any high power transmission system where high power needs to be transmitted over considerable distances like over 1-2 km. Furthermore, it should be noted that various modifications and variations are possible for a skilled person on the basis of the above teachings. Therefore, the scope of the present invention is not limited to the above descriptions or the contents of the claims. What has been described above is only what the inventors presently conceive as the best mode of the invention and further embodiments are possible on the basis of the present specification.

Reference numerals in the claims only serve clarification purposes and do not limit the scope of these claims.

What is claimed is:

1. A three-phase high voltage cable arrangement for transmitting power from a first location to a second location including a first, second and third high voltage cable, each high voltage cable having a conductor and a screen wherein the screens are cross-bonded twice over said distance at particular cross-bonding locations to cancel out the screen voltages, said first, second and third cable each comprising at least one water sensing wire for sensing water intrusion into the respective cable, said water sensing wires being cross-bonded twice over said distance at said cross-bonding locations wherein the cross-bonding of the water sensing wires is performed in the same cyclic order as the cross-bonding of the screens to cancel out difference voltages between the water sensor wires and the cable screens.

2. A cable arrangement according to claim 1, wherein said cable arrangement comprises a first, second and third cable section each comprising said first, second and third cable, said cross-bonding locations being at a respective joint at which the respective cores of the cables are connected.

3. A cable arrangement according to claim 1, wherein said cable arrangement comprises a first, second and third cable section each comprising said first, second and third cable, said cross-binding locations being located anywhere along the length of the cable arrangement where the cable coating is opened for cross-bonding.

4. A cable arrangement according to claim 1 or 2, wherein at each cross bonding location a first, second and third pair of water sensing wire cross-bonding connection cables are connected with the respective water sensing wires and a first, second and third screen cross-bonding connection cable connected with the respective screens of the respective cables are provided for connection with a water sensing wire cross-bonding device and a screen cross-bonding device.

5. A cable arrangement according to claim 4, wherein said screen cross-bonding device and said water sensing wire cross-bonding device are arranged in two different cross-bonding boxes.

6. A cable arrangement according to claim 4, wherein said screen cross-bonding device and said water sensing wire cross-bonding device are arranged in a single common cross-bonding box.

* * * * *